United States Patent
Cheng et al.

(12) 
(10) Patent No.: US 6,814,041 B1
(45) Date of Patent: Nov. 9, 2004

(54) MULTI-FREQUENCY ENGINE INTAKE RESONATOR

(75) Inventors: C. Raymond Cheng, Madison, WI (US); Jeffrey A. Rech, Verona, WI (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 10/355,502

(22) Filed: Jan. 31, 2003

(51) Int. Cl.[7] .............................................. F02M 35/10
(52) U.S. Cl. ................................. 123/184.57; 181/229
(58) Field of Search ........................ 123/184.57, 184.53; 29/888.01; 62/296, 323.1; 181/229

(56) References Cited

U.S. PATENT DOCUMENTS

| | | | |
|---|---|---|---|
| 3,955,643 A | 5/1976 | Clark | |
| 3,966,014 A | * 6/1976 | Gowing | 181/229 |
| 4,501,341 A | 2/1985 | Jones | |
| 5,014,816 A | 5/1991 | Dear et al. | |
| 5,040,495 A | 8/1991 | Harada et al. | |
| 5,283,398 A | 2/1994 | Kotera et al. | |
| 5,317,112 A | 5/1994 | Lee | |
| 5,333,576 A | 8/1994 | Verkleeren | |
| 5,783,780 A | 7/1998 | Watanabe et al. | |
| 5,996,733 A | 12/1999 | DeTuncq et al. | |
| 6,199,657 B1 | 3/2001 | Misawa et al. | |
| 6,595,013 B1 | 7/2003 | Simeone | |

* cited by examiner

*Primary Examiner*—Tony M. Argenbright
*Assistant Examiner*—Katrina B. Harris
(74) *Attorney, Agent, or Firm*—Andrus, Sceales, Starke & Sawall, LLP

(57) ABSTRACT

An engine intake resonator and manufacturing method is provided by a pair of molded sheets mated to each other along a plane and defining a plurality of tubular channels therebetween and having different length for attenuation of different frequencies.

24 Claims, 8 Drawing Sheets

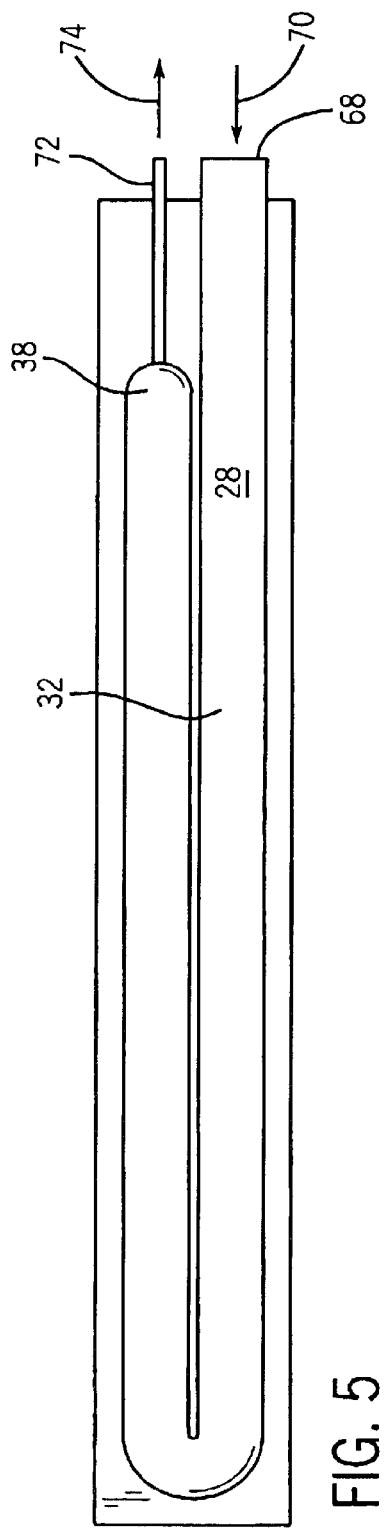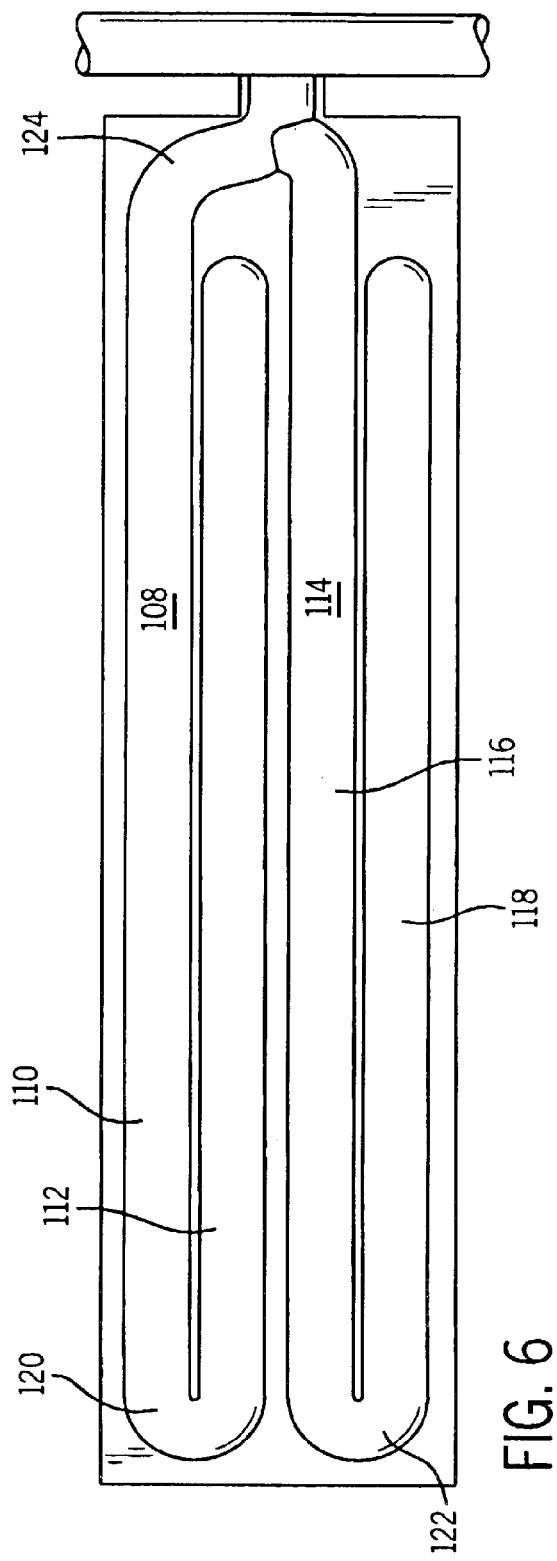
FIG. 5
FIG. 6

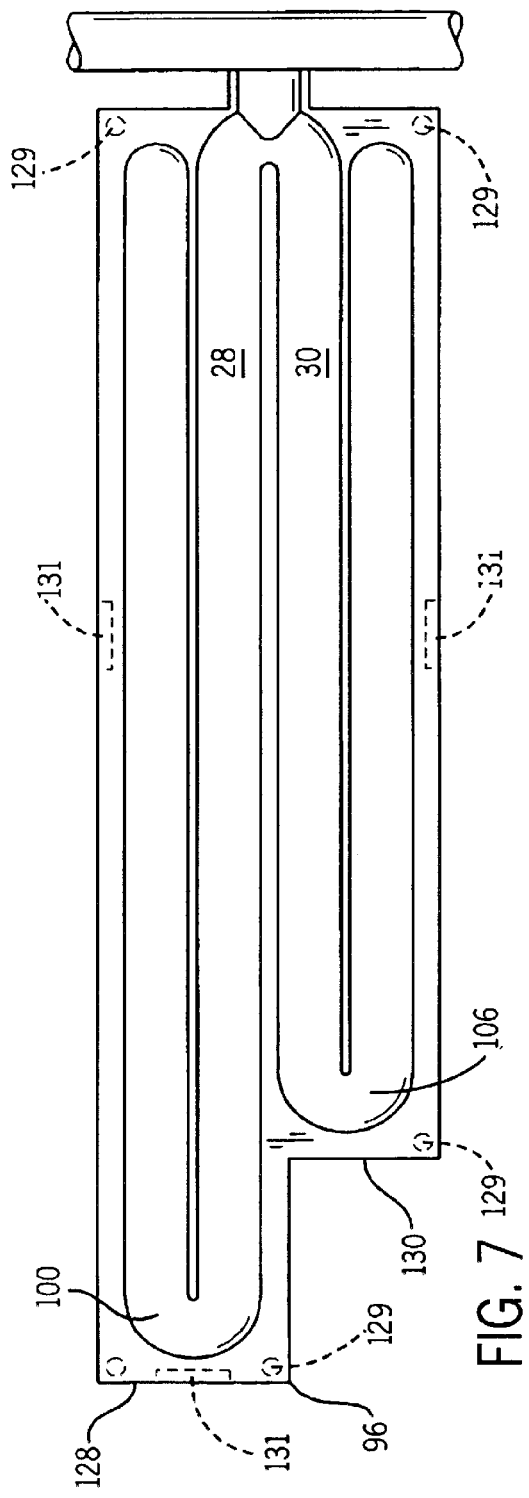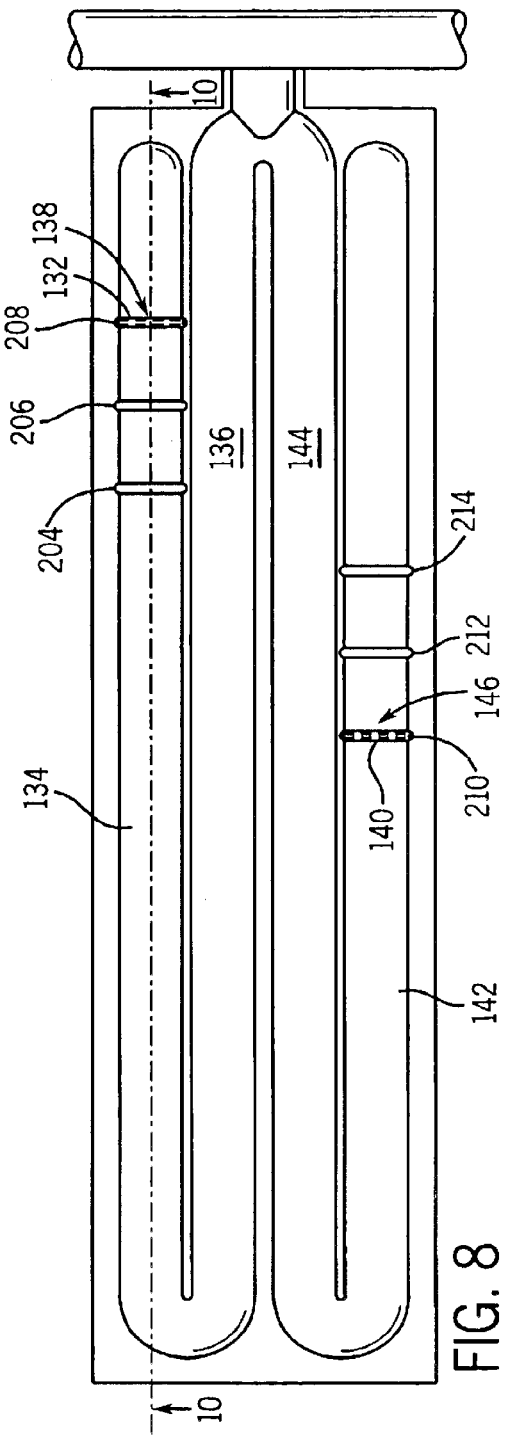

MULTI-FREQUENCY ENGINE INTAKE RESONATOR

BACKGROUND AND SUMMARY

The invention relates to engine intake resonators, and more particularly to a space-efficient and manufacturing-efficient multi-frequency resonator.

For a multiple-cylinder internal combustion engine operating in a specific RPM (revolutions per minute) range, the dominant firing frequencies of the induction noise can vary substantially. Conventional side-branch resonators used in the induction system such as Helmholtz and quarter-wavelength resonators are tuned to specific frequencies and are only effective within narrow operating ranges. The resonators cancel the induction noise at the predetermined resonant frequency. Typical intake resonators occupy a large volume or lengthy dimension in packaging space and are generally restricted to higher frequency applications by such volume and length.

The present invention overcomes the noted space requirements, and also affords manufacturing efficiencies, in providing a one-piece unit of multiple quarter-wavelength resonators used to attenuate multiple dominant frequencies of the induction noise. The targeted noise can be either the fundamental firing frequency and its subsequent harmonics at a fixed engine operating RPM, or the fundamental firing frequencies at various fixed engine operating RPMs.

In the preferred embodiment, the invention provides a one-piece unit of multiple quarter-wavelength resonators designed to attenuate selective dominant frequencies of the induction noise. A plastic intake resonator is molded to conform to available packaging space, and can be incorporated into the existing air cleaner housing, engine cover, bottom pan, door panel of the engine or the equipment, etc. The invention enables the use of different materials and molding processes to manufacture the resonators, including injection molding, blow molding, and rotational molding. The invention enables the use of twin-sheet forming, a process known and familiar to those in the art and manufacturing-efficient, to afford a low cost manufacturing process for a plastic intake resonator.

The resonant frequency of a quarter-wavelength resonator is determined by its length, and a single resonator is capable of reducing the tonal frequency noise by 5 to 15 dB. In order to target several frequencies simultaneously, a one-piece unit of multiple quarter-wavelength resonator segments can be formed by folding the side-branch resonator tubes into two or more segments. The cross-sectional shape of the tube can be varied as long as its cross-sectional area over the length remains constant, in the preferred embodiment. The end of each tube is capped and preferably remains airtight for the best acoustical performance.

The invention enables the noted use of twin-sheet forming as a molding technique for making the quarter-wavelength resonators. This process involves the forming of two separate heated plastic sheets of material into separate tools while fusing them together under pressure to make a part with hollow sections. The heated flat sheet of thermoplastic is shaped to form two clamshell-like mating parts. Metal inserts or discs can be molded into the part to adjust the length of the quarter-wavelength tube required for acoustic tuning. The process yields superior bonding as compared to other post-forming methods, and is accomplished during a single machine cycle. Additional features such as taps and bolt holes for fastening can be included in the molded part.

BRIEF DESCRIPTION OF THE DRAWINGS

FIG. 3 illustrates a manufacturing step in making the resonator of FIG. 1.

FIG. 4 is like FIG. 3 and illustrates a further manufacturing step.

FIG. 5 is an illustration of a portion of the resonator of FIG. 1 during manufacture.

FIG. 6 is like FIG. 1 and shows an alternate embodiment.

FIG. 7 is like FIG. 1 and shows another embodiment.

FIG. 8 is like FIG. 1 and shows another embodiment.

DETAILED DESCRIPTION

Figure 1:
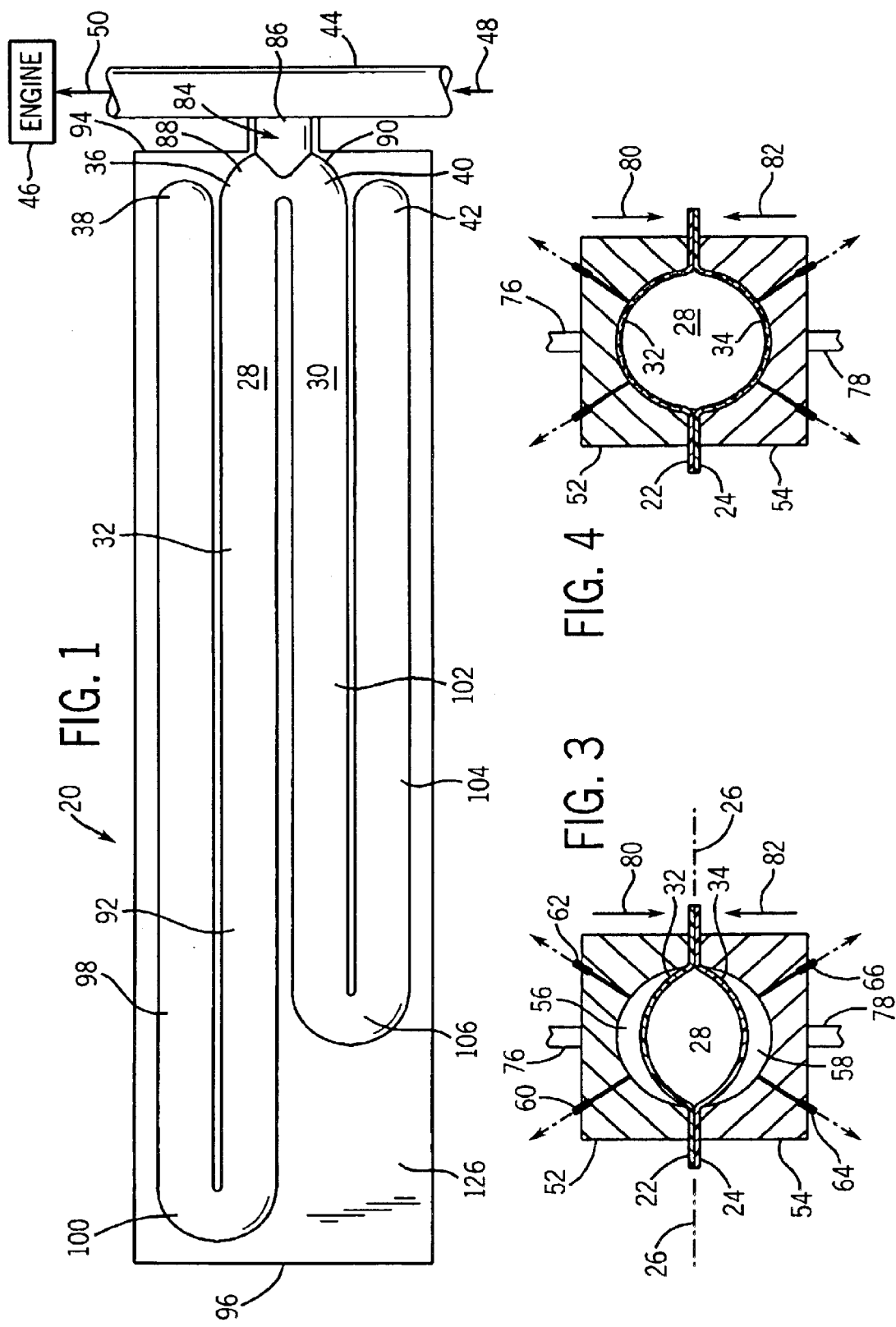
FIG. 1 is a top elevation view of an engine intake resonator in accordance with the invention.
Figure 2:
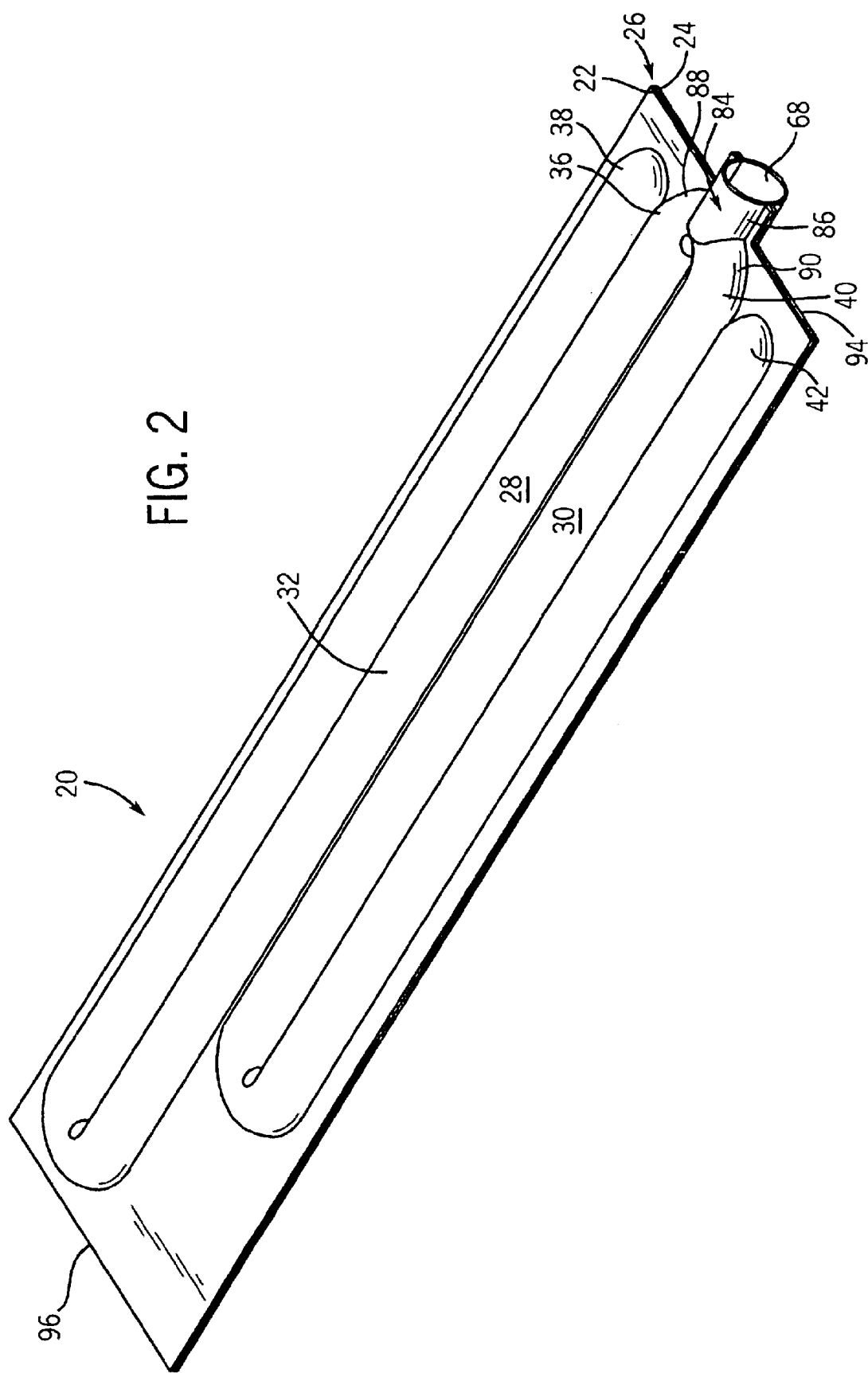
FIG. 2 is a perspective view of the resonator of FIG. 1.

FIGS. 1 and 2 show an engine intake resonator 20 provided by a pair of molded sheets 22 and 24, FIGS. 2, 3, mated to each other along a plane 26 and defining a plurality of tubular channels such as 28, 30 therebetween. A half 32, FIG. 3, of a respective channel 28 is formed during molding of a respective flat planar sheet 22 to deform a portion of such sheet at 32 and bulge such portion laterally away from plane 26. Likewise, a half 34, FIG. 3, of a respective channel is formed during molding of a respective flat planar sheet 24 to deform a portion of such sheet at 34 and bulge such portion laterally away from plane 26. Each channel 28, 30, etc. is formed by mating of sheets 22, 24 along plane 26 with respective opposing half channels such as 32, 34 forming a respective channel such as 28.

First channel 28, FIGS. 1, 2, has a first length between an entrance end 36 and a terminating end 38. Second channel 30 has a second length between an entrance end 40 and a terminating end 42. The noted second length is different, e.g. shorter, than the noted first length, for attenuation of different frequencies of noise in engine intake duct 44 which provides the intake to engine 46 as shown at arrows 48, 50. Tubular channels 28, 30 are preferably round in lateral cross section. Sheets 22 and 24 are preferably mirror images of each other at the channels 28, 30. In one forming method, two sheets of material 22, 24 are clamped together in a single frame with an air nozzle between the sheets. The sheets are pre-heated in an oven, consisting of upper and lower heaters, and each sheet is heated from one side only. Hot air is blown through the nozzle between the sheets providing air movement to keep the sheets separated during the heating cycle. The pre-heated sheets are introduced into a mold between mold halves 52 and 54, FIG. 3. The mold halves are pressed together by mandrels or rams 76 and 78 as shown at arrows 80 and 82. Vacuum is applied to draw the sheets into the mold, as shown at evacuation arrows at vacuum ports such as 60, 62, 64, 66 and positive pressure is applied to the channel entrances as at opening or mouth 68, FIGS. 2, 5, as shown at arrow 70, with escape provided at terminating channel end 38 through passage 72, as shown at arrow 74, which passage 72 is closed off after formation of the channels. Pressure of the joining mold seals sheets 22 and 24 therebetween along the peripheries of the channels such as 28. FIG. 3 shows channel formation during deformation of sheet bulge portions 32, 34, and FIG. 4 shows the channel upon completion of formation thereof.

In the embodiment of FIG. 1, terminating ends 38 and 42 of channels 28 and 30 are separate and spaced from each other. Entrance ends 36 and 40 are common to each other at T-shaped inlet 84 having a trunk 86 for receiving intake noise from duct 44 and having a pair of arms 88 and 90 diverging oppositely from trunk 86 and transmitting the noise to entrance ends 38 and 40 of channels 28 and 30. Each of channels 28 and 30 has a U-shape in plane 26. U-shaped channel 28 has a first leg 92 extending longitudinally (right-left in FIG. 1) along plane 26 from a first right end 94 of the sheets to a second left end 96 of the sheets. U-shaped channel 28 has a second leg 98 extending longitudinally along plane 26 from end 96 of the sheets. U-shaped channel 28 has a bight 100 at end 96 of the sheets joining legs 92 and 98. U-shaped channel 30 has a leg 102 extending longitudinally (right-left in FIG. 1) along plane 26 from right end 94 of the sheets. U-shaped channel 30 has a leg 104 extending longitudinally along plane 26. U-shaped channel 30 has a bight 106 at end between legs 98 and 104 on laterally opposite sides thereof such that leg 92 is laterally between legs 98 and 102, and such that leg 102 is laterally between legs 92 and 104. Legs 92, 98, 102, 104 are all parallel to each other. In another embodiment, FIG. 6, U-shaped channel 108 has legs 110 and 112, and U-shaped channel 114 has legs 116 and 118. Legs 112 and 116 are laterally adjacent each other and between legs 110 and 118 on laterally opposite sides thereof, such that leg 112 is laterally between legs 110 and 116, and such that leg 116 is laterally between legs 112 and 118. In FIG. 1, bight 106 is longitudinally spaced from bight 100, and legs 102 and 104 are shorter than legs 92 and 98. In FIG. 6, bight 120 of channel 108 and bight 122 of channel 114 are not longitudinally spaced from each other, and legs 112 and 118 have the same longitudinal length, however a longer channel length is provided for channel 108 by connecting segment 124, to thus provide attenuation of different frequencies. In another embodiment, section 126, FIG. 1, of the sheets is removed, e.g. where desired for packaging application in an engine compartment or the like, such that end 96 of the sheets has a first segment 128, FIG. 7, at bight 100 of U-shaped channel 28, and a second segment 130 at bight 106 of U-shaped channel 30, wherein segment 130 is longitudinally spaced from segment 128. In further embodiments, bolt holes such as 129 and/or taps or notches or flanges such as 131 can be molded into the part for fastening, keyed placement, etc.

Figure 9:
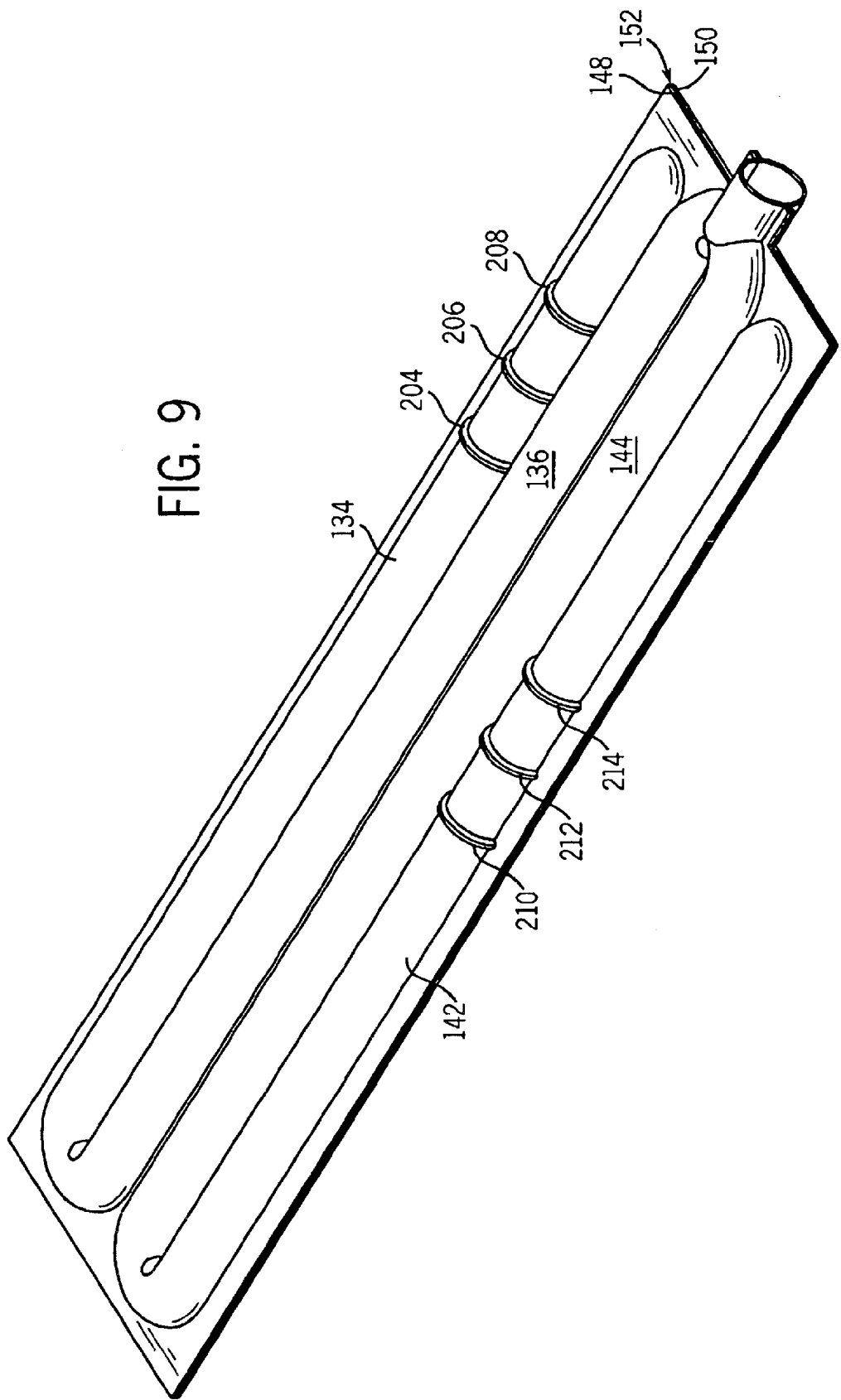
FIG. 9 is a perspective view of the resonator of FIG. 8.
Figure 10:
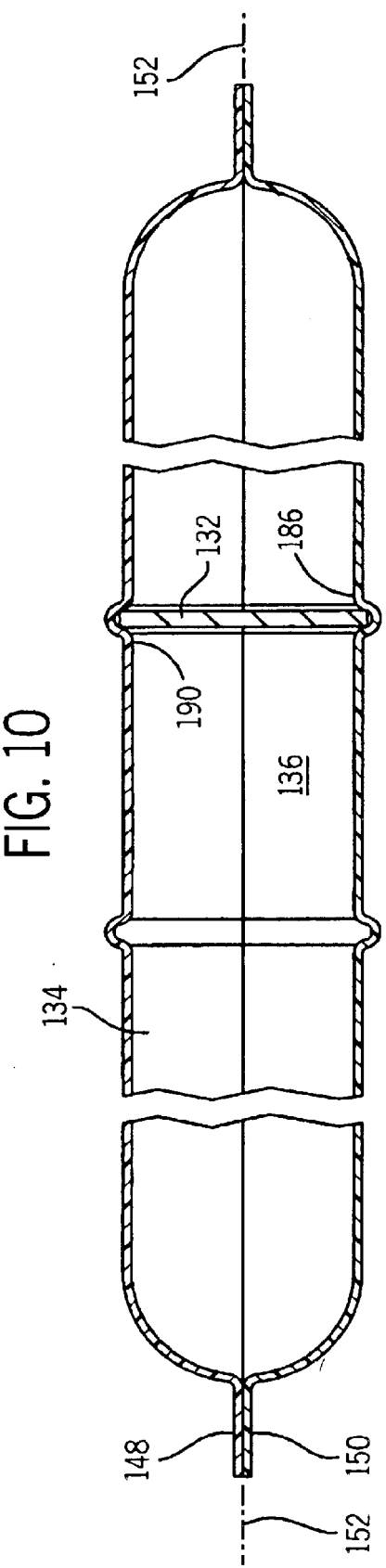
FIG. 10 is a sectional view taken along line 10—10 of FIG. 8.
Figure 11:
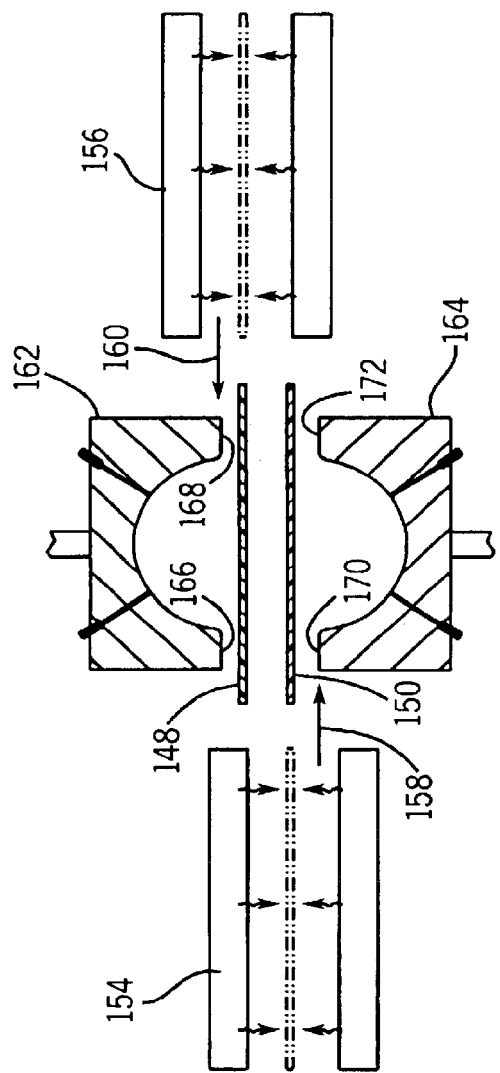
FIG. 11 illustrates a manufacturing step in making the resonator of FIG. 8.
Figure 12:
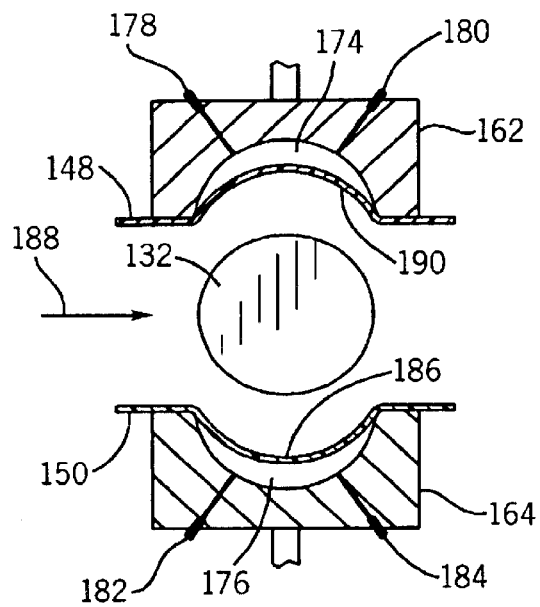
FIG. 12 is like FIG. 11 and shows a further manufacturing step.
Figure 13:
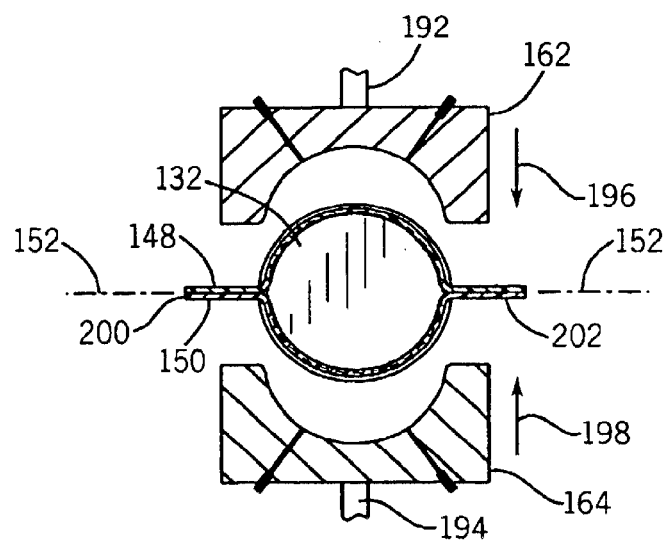
FIG. 13 is like FIG. 12 and shows a further manufacturing step.

In another embodiment, FIGS. 8–10, a first disc 132 extends across leg 134 of channel 136 and provides the terminating end 138 of the channel. A second disc 140 extends across leg 142 of channel 144 and provides the terminating end 146 of such channel. Flat planar starting sheets 148 and 150, FIGS. 9–11, extending along plane 152, are initially heated on both sides of the sheet in separate respective ovens 154 and 156 with top and bottom heaters in each oven, respectively, FIG. 11, and then inserted as shown at arrows 158 and 160 into a mold between mold halves 162 and 164. Each sheet is then brought into contact with respective mold faces 166 and 168, and 170 and 172, and vacuum is applied to each respective mold-half cavity 174 and 176, FIG. 12, through respective vacuum evacuation ports 178 and 180, and 182 and 184, to draw the respective sheets 148 and 150 into the mold halves 162 and 164. Each respective disc such as disc 132 is then inserted into a respective half channel such as 186, as shown at arrow 188, during the molding operation and is engaged by the respective opposing half channel 190 upon mating of sheets 148 and 150 along plane 152 upon closing of the mold, FIG. 13, as the mold halves 162 and 164 are driven towards each other by respective mandrels or rams 192 and 194 as shown at respective arrows 196 and 198. Sheets 148 and 150 seal to each other by the application of pressure along edges 200 and 202 along the periphery of the channels. Disc 140 is likewise inserted into leg 142 of channel 144 during the noted molding.

The respective lengths of channels 136 and 144 are selectively and independently variable according to independent and selective placement of discs 132 and 140 during molding. The channels preferably have a plurality of grooves such as 204, 206, 208, 210, 212, 214, etc. herein along respective half channels such as 186, 190, etc. at predetermined locations therealong for guided selective placement of a respective disc to provide a desired channel length for a designated frequency. For example, if a shorter length is desired for channel 136, then disc 132 is placed in groove 204 or 206, rather than groove 208. As another example, if a longer length is desired for channel 144, disc 140 is placed in groove 212 or 214, rather than groove 210. In preferred form, the groove is a semi-circular molded detent around the disc, which detent is formed in the sheet by the respective mold half 162, 164, FIG. 12.

Figure 14:
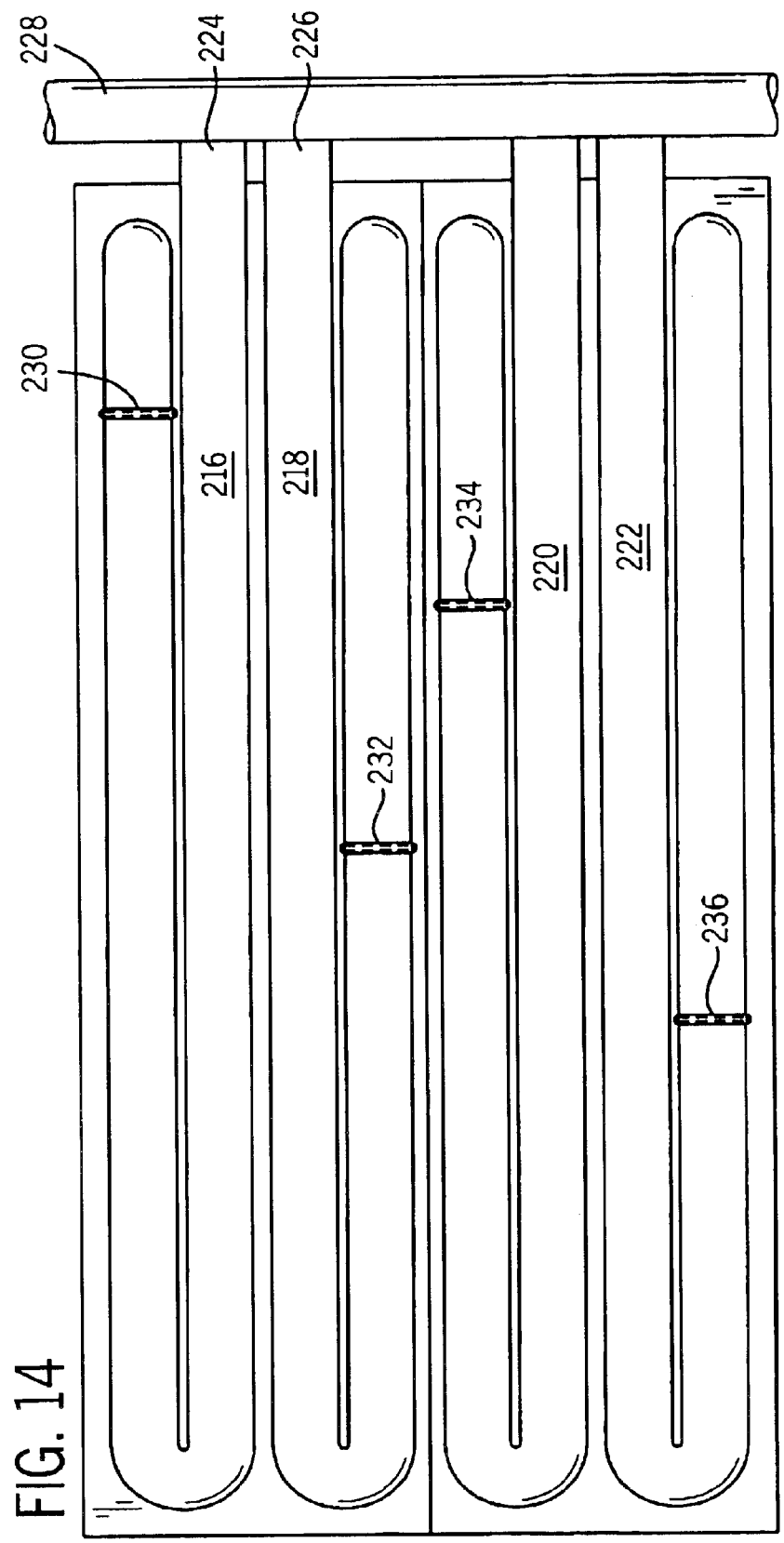
FIG. 14 is like FIG. 8 and shows another embodiment.

FIG. 14 shows a further embodiment, including multiple sets of channels, such as channels 216 and 218, and channels 220 and 222. Entrance ends 224 and 226 of channels 216 and 218, respectively, are separate and spaced from each other and separately connected to engine intake duct 228. The channels may be terminated as above in FIGS. 1–7, or as above in FIGS. 8–13 for example by discs such as 230, 232, 234, 236, etc. The relative sizes of intake duct 228 and channel entrances 224 and 226, as well as intake duct 44, FIG. 1, and entrance 86, as well as the intake and entrance ducting in FIG. 8, may be sized according to desired acoustic impedance matching or mismatching, e.g. the cross sectional areas may be the same or may be different.

The present system desirably provides a method for making an engine intake resonator by providing a pair of planar sheets, molding the sheets in a mold to mate the sheets to each other along a plane and defining a plurality of tubular channels therebetween, molding half of a respective channel during molding of the first of the sheets and deforming a portion of the first sheet and bulging a portion of the first sheet laterally away from the plane, molding another half of the respective channel during molding of the second of the sheets and deforming a portion of the second sheet and bulging such portion of the second sheet laterally away from the plane, and forming each channel by mating the sheets along the noted plane with respective opposing half channels forming a respective channel. The method further includes providing the first and second channels of differing length for attenuation of different frequencies. The method further includes providing the first and second sheets as mirror images of each other at the channels. The method further includes molding and deforming the half channels and mating the sheets to form round tubular channels in the preferred embodiment. The method further includes providing in a further embodiment a first disc for a first of the channels, providing a second disc for a second of the channels, placing each disc in a respective half channel during molding, and engaging each disc by the respective opposing half channel during mating of the sheets along the noted plane. The method further includes selectively and independently setting differing lengths of the first and second channels by variably placing the first and second discs along the first and second channels, respectively, during the molding operation. The method further includes molding in guide grooves in at least one of the half channels at predetermined locations therealong for guided selected placement of a respective disc to provide a desired channel length for a designated frequency.

It is recognized that various equivalents, alternatives and modifications are possible within the scope of the appended claims.

What is claimed is:

1. An engine intake resonator comprising a pair of molded sheets mated to each other along a plane and defining a plurality of tubular channels therebetween, a half of a respective channel being formed during molding of a respective flat planar sheet to deform a portion of said sheet and bulge said portion laterally away from said plane, each channel being formed by mating of said sheets along said plane with respective opposing half channels forming a respective channel, a first of said channels having a first length between an entrance and a terminating end, a second of said channels having a second length between an entrance and a terminating end, said second length being different than said first length, for attenuation of different frequencies.

2. The engine intake resonator according to claim 1 wherein said sheets are mirror images of each other at said first and second channels.

3. The engine intake resonator according to claim 2 wherein said tubular channels are round.

4. The engine intake resonator according to claim 1 wherein said terminating ends of said first and second channels are separate and spaced from each other.

5. The engine intake resonator according to claim 1 wherein said entrance ends of said first and second channels are common to each other.

6. The engine intake resonator according to claim 5 comprising a T-shaped inlet having a trunk for receiving intake noise, and having a pair of arms diverging oppositely from said trunk and transmitting said noise to said entrance ends of said first and second channels, respectively.

7. The engine intake resonator according to claim 1 wherein said entrance ends of said first and second channels are separate and spaced from each other.

8. The engine intake resonator according to claim 1 wherein each of said first and second channels has a U-shape in said plane, said U-shaped first channel has a first leg extending longitudinally along said plane, said U-shaped first channel has a second leg extending longitudinally along said plane, said U-shaped first channel has a first bight joining said first and second legs, said U-shaped second channel has a third leg extending longitudinally along said plane, said U-shaped second channel has a fourth leg extending longitudinally along said plane, said U-shaped second channel has a second bight joining said third and fourth legs.

9. The engine intake resonator according to claim 8 wherein said first and third legs are laterally adjacent each other and between said second and fourth legs on laterally opposite sides thereof, such that said first leg is laterally between said second leg and said third leg, and such that said third leg is laterally between said first leg and said fourth leg.

10. The engine intake resonator according to claim 8 wherein said second and third legs are laterally adjacent each other and between said first and fourth legs on laterally opposite sides thereof, such that said second leg is laterally between said first leg and said third leg, and such that said third leg is laterally between said second leg and said fourth leg.

11. The engine intake resonator according to claim 8 wherein said first, second, third and fourth legs are all parallel to each other.

12. The engine intake resonator according to claim 8 wherein said second bight is longitudinally spaced from said first bight, and said third leg is shorter than said first leg.

13. The engine intake resonator according to claim 12 wherein said sheets extend longitudinally between first and second ends, said second end of said sheets has a first segment at said first bight, and a second segment at said second bight, and said second segment is longitudinally spaced from said first segment.

14. The engine intake resonator according to claim 1 comprising a first disc extending across said first channel and providing said terminating end of said first channel, and a second disc extending across said second channel and providing said terminating end of said second channel, each said disc being inserted into a respective said half channel during said molding and engaged by the respective opposing half channel upon said mating of said sheets along said plane.

15. The engine intake resonator according to claim 14 wherein said first and second lengths of said first and second channels are selectively and independently variable according to selective placement of said first and second discs during said molding.

16. The engine intake resonator according to claim 14 wherein at least one of said half channels has a plurality of grooves therein at predetermined locations therealong for guided selective placement of a respective said disc to provide a desired channel length for a designated frequency.

17. The engine intake resonator according to claim 16 wherein each said groove is a semi-circular molded detent around said disc.

18. A method for making an engine intake resonator, comprising providing a pair of planar sheets, molding said sheets in a mold to mate said sheets to each other along a plane and defining a plurality of tubular channels therebetween, molding half of a respective channel during molding of the first of said sheets and deforming a portion of said first sheet and bulging said portion of said first sheet laterally away from said plane, molding another half of said respective channel during molding of the second of said sheets and deforming a portion of said second sheet and bulging said portion of said second sheet laterally away from said plane, forming each said channel by mating said sheets along said plane with respective opposing said half channels forming a respective channel.

19. The method according to claim 18 comprising providing first and second channels of differing length for attenuation of different frequencies.

20. The method according to claim 19 comprising providing said first and second sheets as mirror images of each other at said channels.

21. The method according to claim 20 comprising molding and deforming said half channels and mating said sheets to form round tubular channels.

22. The method according to claim 18 comprising providing a first disc for a first of said channels, providing a second disc for a second of said channels, placing each said disc in a respective half channel during said molding, and engaging each said disc by the respective opposing half channel during said mating of said sheets along said plane.

23. The method according to claim 22 comprising selectively and independently setting different lengths of said first and second channels by variably placing said first and second discs along said first and second channels, respectively, during said molding.

24. The method according to claim 22 comprising molding in guide grooves in at least one of said half channels at predetermined locations therealong for guided selected placement of a respective said disc to provide a desired channel length for a designated frequency.

* * * * *